United States Patent [19]

Seron

[11] Patent Number: 5,092,018
[45] Date of Patent: Mar. 3, 1992

[54] LANYARD CONSTRUCTION

[76] Inventor: Suren V. Seron, Seron Manufacturing Co., 254 Republic Dr., Joliet, Ill. 60435

[21] Appl. No.: 512,044

[22] Filed: Apr. 17, 1990

Related U.S. Application Data

[63] Continuation-in-part of Ser. No. 326,007, Mar. 20, 1989, Pat. No. 5,027,477.

[51] Int. Cl.⁵ .............................................. A44B 21/00
[52] U.S. Cl. ...................................... 24/3 B; 24/3 R; 24/598.4; 119/106
[58] Field of Search ............... 24/3 B, 3 C, 3 R, 3 A, 24/598.4, 265 EE, 200, 136 L, DIG. 11, 447, 90 HA, 90 A, 601.2, 304; 119/106; 248/205.3; 403/268; 280/820, 821; 224/258

[56] References Cited

U.S. PATENT DOCUMENTS

| | | | |
|---|---|---|---|
| 893,969 | 7/1908 | Bachrach | 24/DIG. 11 |
| 967,664 | 8/1910 | Peterson. | |
| 1,384,666 | 7/1921 | Lamont | 24/19 |
| 2,100,088 | 11/1937 | Robertson | 224/258 |
| 2,143,985 | 1/1939 | Kellems | 403/268 |
| 2,704,961 | 3/1955 | Weil | 24/3 C |
| 2,803,486 | 8/1957 | Larson et al. | 403/268 |
| 3,162,920 | 12/1964 | Durham | 24/DIG. 11 |
| 4,186,690 | 2/1980 | Seiler. | |
| 4,196,485 | 4/1980 | Wilkinson | 403/268 |
| 4,229,016 | 10/1980 | Wolf | 280/821 |
| 4,665,592 | 5/1987 | Kasai. | |
| 4,790,646 | 12/1988 | Seron. | |

Primary Examiner—Victor N. Sakran
Attorney, Agent, or Firm—Wood, Phillips, Mason, Recktenwald & Van Santen

[57] ABSTRACT

A lanyard construction having two ends of a strap forming a closed loop of flexible material adapted to be disposed about a part of human body, including a mounting element formed of a body of elastomer. The mounting element includes a recess having the same cross sectional shape as the two ends in which the two ends are bonded to each other and to the mounting element by means of an adhesive.

8 Claims, 1 Drawing Sheet

LANYARD CONSTRUCTION

This application is a continuation-in-part of my co-pending application Ser. No. 326,007 filed Mar. 20, 1989 entitled Breakaway Lanyard and assigned to the same assignee as the instant application.

FIELD OF THE INVENTION

This invention relates to an assembly that includes a strap that is adapted to be placed about a body part such as a lanyard or the like. More particularly, this invention relates to improved lanyard mounting element receiving and holding fixtures.

BACKGROUND OF THE INVENTION

There are many types of articles that include a strap to be worn about a part of the body which may be generically termed lanyards and may include loop like elements worn about the neck or the wrist and even belts worn about the waist. In many cases, these lanyards are fitted with some sort of mounting element such as hooks so that another article such as an identification card, whistle, stop watch or the like may be attached to the strap.

In a common lanyard design, two ends of a strap are brought together to form a loop. The mounting element is attached to the two ends of the strap at the point where the two ends meet. Typically, the ends of the lanyard are brought together in a recess contained within the lanyard mounting element.

It is important that such lanyards be designed so that the two ends of the strap can be securely fastened to the mounting element in order to sustain the functional structure of the lanyard under the stress of the weight of the object suspended therefrom as well as the tugging force, albeit relatively light, that may be applied to the lanyard strap when the lanyard is supporting an article that is intended to be gripped, such as a whistle or a stop watch. It is also important for economic reasons that such a bonding structure for a mounting element of a lanyard be easily constructed of inexpensive materials.

In previous designs, it has been necessary to provide means such as a clamping element or ferrule for securing the lanyard strap ends to the mounting element. For example, U.S. Pat. No. 3,861,813 issued Jan. 21, 1975 to S. M. Seron, discloses a lanyard having a retainer from which an object can be suspended that is securely attached to the lanyard strap ends by means of a ferrule. While the lanyard disclosed in that patent is well-designed, the presence of this component adds some expense to the manufacturing cost of the lanyard simply in terms of cost of the part. There also tends to be added manufacturing costs in terms of increased labor that is required to assemble the ferrule to the mounting element and to the strap over the labor costs that would be present if such a ferrule was not required.

Thus while lanyards of the type mentioned worked extremely well for their intended purpose and have been quite successful over the years, it is desirable to reduce the cost of manufacture thereof. The present invention, therefore, is intended to provide an economical and easy method of securely attaching the lanyard ends to the mounting element.

That is, the present invention is directed to overcoming one or more of the above problems and specifically directed to reducing the manufacturing costs of a lanyard of the type identified previously.

SUMMARY OF THE INVENTION

It is the principal object of the invention to provide a new and improved lanyard construction. More specifically, it is an object of the invention to provide a lanyard construction that is simple in construction and economical to manufacture.

An exemplary embodiment of the invention achieves the foregoing object in a lanyard which includes a strap of flexible material having two adjacent, opposed ends that form a closed loop and a plastic mounting element bonded to the adjacent ends.

In a highly preferred embodiment of the invention, the mounting element is a hook assembly which includes a base and an integral hook extending from the base and terminating in a redirected end facing the base. An integral resilient finger is on the base and adjacent to the hook and extends towards the end of the hook and is engageable therewith. The assembly is formed of a single piece of plastic.

In this highly preferred embodiment, the base of the hook has at least one recess in which the ends of the strap are received. The two ends of the strap have a cross sectional shape approximating that of the recess and a bonding means are located in the recess to bond the two strap ends to each other and to the body. Thus, the need for a separate fastener such as a ferrule is avoided.

Preferably, the bonding means comprises an adhesive. The adhesive preferably is a cyanoacrylate compound.

In a highly desirable form of the invention the strap is a polypropylene or nylon. The strap may include a plurality of fibers woven or braided to form a fabric. Typically, the cross sectional shape of the strap is that of a flat rectangle.

Other objects and advantages will become apparent from the following specification taken in connection with the accompanying drawings.

DESCRIPTION OF THE PREFERRED EMBODIMENT

Figure 1:
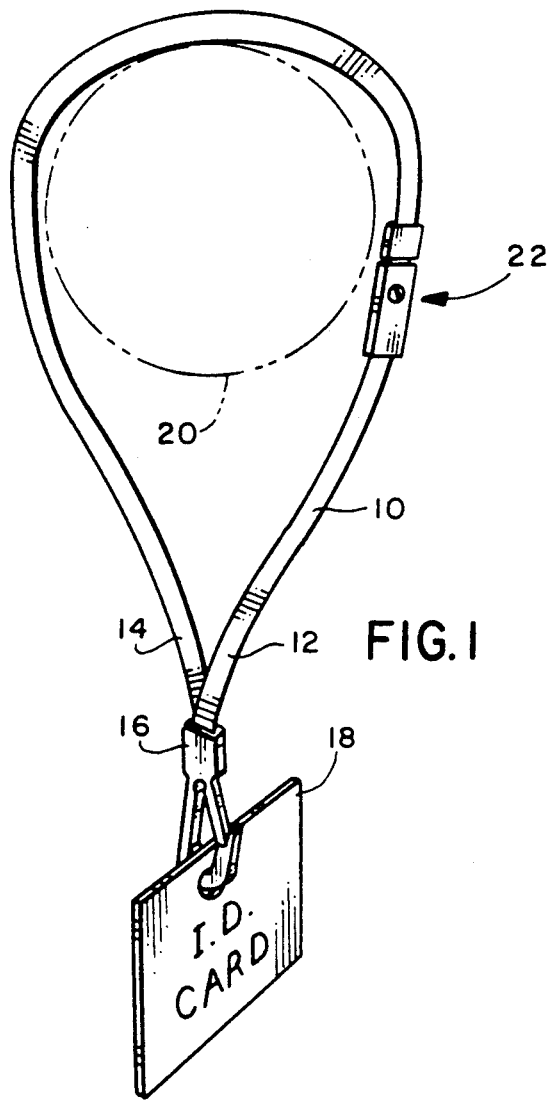
FIG. 1 is a perspective view of a lanyard made according to the invention.

An exemplary embodiment of the lanyard made according to the invention is illustrated in FIG. 1 and is seen to include an elongated strap 10 of flexible material such as plastic.

Two ends 12 and 14 of the strap 10 come together and are joined to a mounting element in the form of a hook 16. The hook 16 may be utilized to mount, for example, an identification card 18 to the strap 10. Typically, with the strap ends 12 and 14 brought together, a closed loop is formed as illustrated in FIG. 1 which may be placed about some part of the body of the wearer. In the embodiment illustrated, the neck 20 of the individual wearing the lanyard is shown in dotted lines. However, it is to be understood that the lanyard can be worn around the waist, wrist, etc. It is also to be understood that other forms of mounting elements other than hooks may be utilized in lieu of the hook 16 and that objects other than identification cards such as the card 18 may be mounted thereto. Examples include whistles, stop watches, game calls and the like.

A weak point 22 may be optionally placed on the lanyard straps. For details of the construction of the weak point on a lanyard, refer to my co-pending application Ser. No. 326,007, the details of which are herein incorporated by reference.

Figure 2:
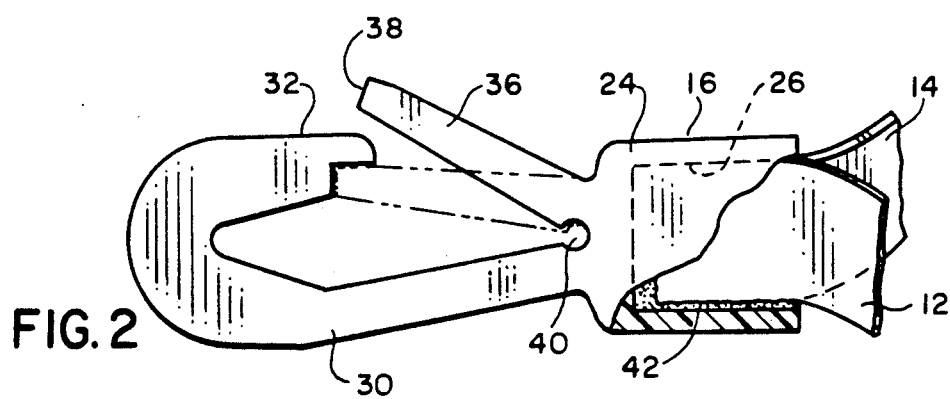
FIG. 2 is a view of a mounting element, specifically a hook, with parts broken away for clarity.

FIG. 2 illustrates a preferred form of the mounting element or hook 16. In a preferred embodiment the hook is made of a plastic such as nylon or an elastomer such as Craton ® available from Shell Oil. As can be seen, the same includes a base 24 including a strap receiving recess 26.

Extending from the base 24 oppositely of the recess 26 is an integral, relatively thick stiff hook element 30 having a redirected end 32 facing the base 24.

Extending from the base 24 in adjacency to the hook 30 is a relatively thin finger 36. The finger 36 is integral with the base 24 and typically the mounting element will be made of plastic to provide for some resilience of the finger 36.

The finger 36 terminates in an end 38 which is inward of the end 32.

The finger 36 and the hook 30 join the base 24 in an interface and to provide for the hinge like action whereby the finger 36 may be moved between the solid and dotted line positions, a recess 40 is located at the interface.

The base 24 may be of any size or shape, the size or shape chosen being dependent only upon the dimensions of the straps employed and particularly the cross sectional shape of the ends 12 and 14 of the strap 10.

The strap retaining recess 26 is adapted to receive the two ends 12 and 14 of the strap 10 which may be glued therein. As illustrated, the ends 12 and 14 of the strap 10 are disposed within the recess 26 and are bounded therein and to each other by adhesive 42.

In the embodiment illustrated, the recess 26 is long and flat and conforms substantially to the cross sectional shape of both of the two ends 12 and 14 of the strap 10 when they are abutted. However, the strap 10 may have a round or a relatively flat cross-section and the cross-section of the recess 26 is modified accordingly.

Alternatively, two recesses 26 for the separate insertion of the ends 12 and 14 of the strap 10 therein could be provided. In this case, the ends 12 and 14 are separately bonded in respective recesses 26 in the base of the mounting element 16.

The strap 10 may be formed of braided, woven or non-woven material and may or may not be elastic. In the preferred embodiment, the strap 10 is made of polypropylene or nylon.

To assure that the ends 12 and 14 are received within the recess 26 and bonded thereto to effect strong securement between the base 24 and the ends 12 and 14, the adhesive 42 preferably is a cyanoacrylate compound. A preferred material for use as the adhesive 42 is one sold by 3M Company as CA40 and characterized as a cyanoacrylate adhesive which actually cures in a very short period of time, a few seconds or less, after application and insertion into the recess 26. First, the adhesive 42 is injected into the recess 26. Quickly thereafter, the ends 12 and 14 are inserted into the recess 26. As a consequence, a firm bond is formed between the ends 12 and 14 and the interior walls of the recess 26. Where the ends 12 and 14 may include some nylon, it is believed that not only is an adhesive bond formed, but a solvent weld bond as well. That is, the adhesive acts to dissolve a quantity of rubber or plastic material forming the base 24 and the ends 12 and 14 such that the three merge during the insertion operation to form a weld having substantial shear strength when the adhesive cures.

From the foregoing, it will be appreciated that a lanyard mounting element made according to the invention eliminates entirely the need for fasteners such as ferrules or the like heretofore employed in joining the lanyard ends to the mounting element. It will also be appreciated that the assembly operation is extremely simple, thereby minimizing labor requirements. As a consequence an extremely effective, but economical to the manufacture, lanyard results.

I claim:

1. A lanyard construction comprising:
   a flexible strap having two adjacent opposed ends and forming a closed loop of flexible material adapted to be disposed about a part of a human body; and
   a mounting element at said adjacent ends of said strap for mounting an element to be displayed or used by the wearer of the lanyard,
   said mounting element being formed of plastic material, including a base with at least one well therein on one end thereof receiving the two ends of said strap and a settable adhesive in said well(s) bonding said ends to said mounting elements within the well(s) thereof.

2. The lanyard of claim 1 wherein said mounting element includes a rigid hook opposite of said base and an integral relatively thin and resilient finger extending from said base into proximity of said hook.

3. The lanyard of claim 1 wherein said strap comprises polypropylene.

4. The lanyard of claim 1 wherein said strap comprises a plurality of fibers that are woven to form a fabric.

5. A lanyard construction comprising:
   a strap of flexible material having two adjacent opposed ends and forming a closed loop of flexible material adapted to be disposed about a part of a human body; and
   a mounting element at said adjacent ends of said strap for mounting an object to be displayed or used by the wearer of the lanyard,
   said mounting element being formed of rigid plastic material and including a base with a well therein on one end thereof receiving the two ends of said strap and a settable adhesive in said well bonding said ends to each other and to said mounting element within the well thereof.

6. The lanyard of claim 5 wherein said strap has a cross sectional shape approximating that of said recess.

7. A lanyard construction comprising:
   a strap having two adjacent opposed ends and forming a closed loop of flexible material adapted to be disposed about a part of a human body; and
   a mounting element at said adjacent ends of said strap for mounting an element to be displayed or used by the wearer of the lanyard,
   said mounting element being formed of plastic material, including a base with at least one recess on one end thereof receiving the two ends of said strap and a cyanoacrylate compound in said recess(es) bonding said ends to said mounting element within the recess(es) thereof.

8. A lanyard construction comprising:
   a strap forming a closed loop of flexible material adapted to be disposed about a part of a human body; and a mounting element for mounting an element to be displayed or used by the wearer of the lanyard,
said mounting element being formed of plastic material, including a base having a well on one end thereof receiving a folded portion of said strap and a cyanoacrylate compound bonding said folded portion to said mounting element within the well thereof.

* * * * *